Dec. 19, 1933.    M. BEREK    1,940,290
OPAQUE ILLUMINATOR FOR MICROSCOPES
Filed Sept. 9, 1932    2 Sheets-Sheet 1

INVENTOR
Max Berek
BY
George C. Heinrich
ATTORNEY

Dec. 19, 1933.   M. BEREK   1,940,290

OPAQUE ILLUMINATOR FOR MICROSCOPES

Filed Sept. 9, 1932   2 Sheets-Sheet 2

INVENTOR
Max Berek
BY
ATTORNEY

UNITED STATES PATENT OFFICE 1,940,290

OPAQUE ILLUMINATOR FOR MICROSCOPES

Max Berek, Wetzlar, Germany, assignor to Ernst Leitz, Optische Werke, G. m. b. H., Wetzlar, Germany Application September 9, 1932, Serial No. 632,314, and in Germany January 29, 1932

1 Claim. (Cl. 88—40)

The diagnostic of the anisotropic effects of double refracting opaque media between crossed Nicols during illumination are extremely difficult. The phenomena are hardly to be interpreted correctly upon the basis of the prevailing theory they are even not reproducible by different observers (cf. M. Schneiderhöhn and P. Randohr, Lehrbuch der Erzmikroskopie, Berlin 1931, vol. 2, page 7).

Our most careful analysis has shown that the reason for this phenomenon is to be found in an imperfectness of the reflecting ingredients of the opaque illuminator. Conventionally a total reflecting prism is used for this purpose for reasons of proper intensity selection. If the polarizer in the path of the radiation is in front of the prism, so will the state of polarization within the field of vision of the microscope not be any more homogeneously linear but will be imparted twofold changes through the total reflection within the prism of the opaque illuminator, namely azimuthal changes of the state of polarization and transformations of the linear polarization from the originally homogeneous linear polarization of the polarizer into elliptical.

In the accompanying drawings forming a material part of this disclosure:

Figure 1:
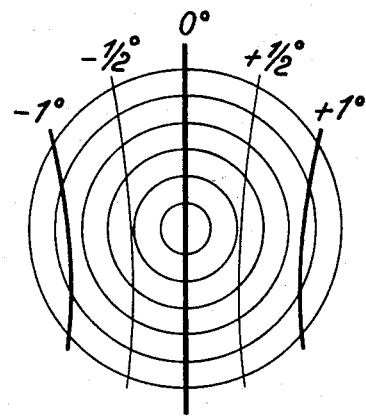
Figs. 1 and 2 are diagrammatic views illustrating the change of the linear polarization into elliptical according to my invention with the use of a reflecting prism.
Figure 2:
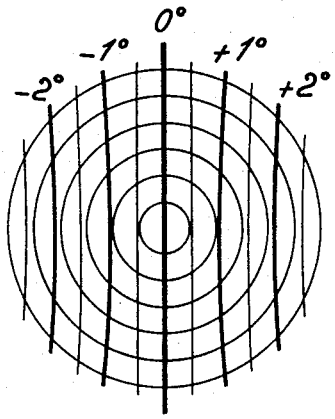

As illustrated in Figures 1 and 2, the change of the linear polarization into the elliptical state of polarization is illustrated and shows clearly this effect (calculated for a total reflecting prism of the index 1, 6), while with homogeneous linear polarization all polarization directions in the line of vision of the microscope, the sphere of which in Figure 1 is accepted as 6°, should lie parallel to the line designated o, as shown in Figure 1, in the field of vision on both sides azimuthal diffractions up to 1°, are appearing. But besides this effect the linear polarization is changed into an elliptical one, and this ellipticity amounts in certain parts of the field of vision nearing ±3°, and the ellipticity is so defined that its trigonometric tangent is equal to the axial proportions of the ellipses.

These phenomena cause erroneous observations of the anisotropic effects in all other parts of the field of vision except the line designated o.

If, moreover, the polarizer and its direction of vibration is not accurately parallel or vertical to the symmetrical plane of the opaque illuminator, the straight line along which the anisotropic effects are correctly represented is laterally displaced in the field of vision, so that the diagnostic becomes totally uncontrollable.

Experiments have shown, that these defects can be noticeably reduced, if a metal mirror is used in place of a total reflecting prism.

Figure 3:
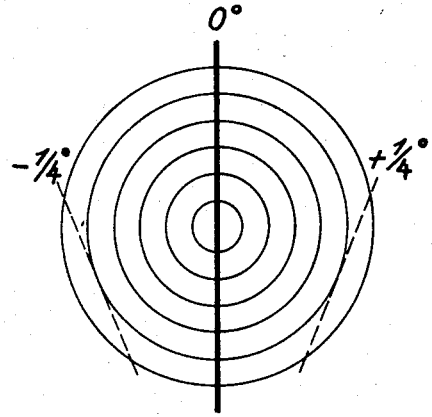
Figs. 3 and 4 are diagrammatic views illustrating the change of linear polarization into elliptical with the use of a metal mirror.
Figure 4:
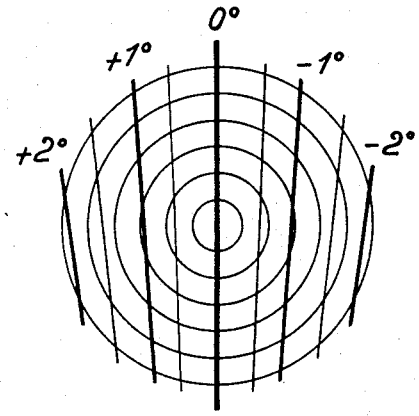

As shown in Figures 3 and 4, the use of a metal mirror will make the azimuthal changes considerably smaller while in comparison, with the effects illustrated in Figures 1 and 2, the elliptic changes have become very insignificant. My experiments have shown, however, that just the elliptical changes of the state of polarization are the cause for extraordinarily strongly falsification of the anisotropic effects. It is, therefore, the replacement of a prism by a metal mirror not sufficient for the observation of sufficiently pure anisotropic effects.

It is, therefore, my main object to present a single optical element by the help of which the harmful effects of the reflection are so far removed as to practically have little or no disturbing effects. This effect is obtained by a combination of a metallic reflection with two light refractions and with a large angle of incidence.

Figure 5:
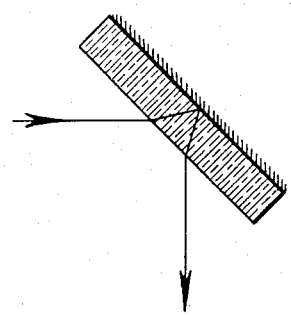
Fig. 5 illustrates a glass plate used as optical element for eliminating the harmful effects of the reflection.

As optical element which answers sufficiently this purpose theoretically a plane parallel plate the rear face of which is metallically silvered is the most simple element (Fig. 5). The refraction at the entrance of the light into the glass plate, and then the metallic reflection against glass, and finally the refraction at the exit of the light from the glass plate effect a far reaching compensation of the defects with suitable selection of the index of refraction of the glass and suitable selection of the metal for the mirror.

However, the practice has shown that such an arrangement cannot be made use of, because the reflection at the front face of the glass plate and the repeated inner reflections within the glass plate are the cause of disturbing reflections in the field of vision, especially then, if as it is customary, an iris diaphragm or shutter in front of the prism is to be pictured within the field of vision.

Figure 6:
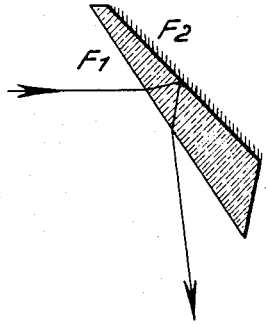
Fig. 6 illustrates a wedge shaped glass body for the same purpose.

These reflections are avoided and nevertheless produce the good effects of the above described combination of refraction and reflection, if the glass plate is replaced by a glass wedge, the wedge angle of which is at least 1°, but is at the best so large, that the light rays which enter through the front face F1 into the wedge and are reflected at the metallically mirrored rear face F2, are leaving again at the front face F1 nearly vertically to their original direction (Fig. 6.)

Figure 7:
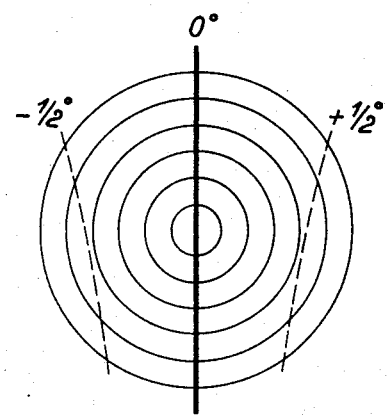
Figs. 7 and 8, are diagrammatic views illustrating the azimuthal and elliptical change effects by the use of a wedge shaped glass body, Figure 6.
Figure 8:
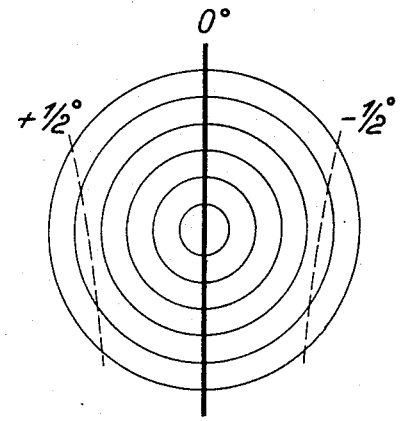

In Figures 7 and 8, is shown the remainder of the azimuthal and elliptical changes for such a glass wedge of 1° wedge angle and for glass of a refraction index of 1.5 with a silvering on the rear face. It will be evident that the elliptical changes which are most vital are considerably diminished.

Instead of using a glass body of the described form naturally a wedge of any other translucent, isotropic or anisotropic material may be used but in such case suitably shaped media must be used.

It will be understood that I have described and shown the preferred form of my device as a few examples only of the many possible ways to practically develop my invention, and that I may make such changes in the general arrangement thereof, and in the construction of its minor details as come within the scope of the appended claim without departure from the spirit of my invention and the principles involved.

Having thus described my invention, what I claim as new and desire to secure by Letters Patent is:

A polarizing device for microscopes to eliminate as much as possible circularly or elliptically polarized light, composed of a metallically mirrored glass wedge, the front glass surface reflecting at different angles elliptically polarized light, and the metallic rear surface reflecting linearly polarized light, said wedge having a lower limit of wedge angle of at least 1°, and an upper limit of 1.5° so as to reflect the light rays entering at the front face of the wedge and reflected at the metallic rear face of same, leaving again at the front face approximately normal to their original direction.

MAX BEREK.